United States Patent [19]

Schmitt et al.

[11] Patent Number: 4,646,757
[45] Date of Patent: Mar. 3, 1987

[54] HARVESTER-THRESHER

[75] Inventors: Helwig Schmitt, Grebenstein; Alois Scharf, Melle, both of Fed. Rep. of Germany

[73] Assignee: BISO Bitter GmbH & Co. KG, Melle, Fed. Rep. of Germany

[21] Appl. No.: 727,017

[22] Filed: Apr. 25, 1985

[30] Foreign Application Priority Data

Apr. 27, 1984 [DE] Fed. Rep. of Germany ....... 3415708

[51] Int. Cl.⁴ ............. A01F 12/40; A01F 29/06; A01F 29/10
[52] U.S. Cl. .................. 130/27 R; 241/101.7
[58] Field of Search ............... 241/101.7, 222, 186.4; 130/27 R, 27 T

[56] References Cited

U.S. PATENT DOCUMENTS

| | | | |
|---|---|---|---|
| 2,752,969 | 7/1956 | Gronberg | 241/101.7 |
| 2,950,747 | 8/1960 | Alloway | 241/101.7 |
| 3,670,739 | 6/1972 | Rowland-Hill | 130/27 T |
| 3,712,309 | 1/1973 | Schmitz | 130/27 R |
| 3,874,604 | 4/1975 | Gronberg et al. | 241/243 |
| 4,056,107 | 11/1977 | Todd et al. | 130/27 R |
| 4,484,587 | 11/1984 | Raineri | 130/27 R |
| 4,510,947 | 4/1985 | Devriese | 130/27 R |
| 4,526,180 | 7/1985 | Scott et al. | 130/27 R |

Primary Examiner—Paul J. Hirsch
Attorney, Agent, or Firm—Dennison, Meserole, Pollack & Scheiner

[57] ABSTRACT

In a combine harvester which conveys the straw which has been separated from grain to the rear outlet by means of a shaker, and wherein grain which is still present is fed to a sieve box, the straw is supplied to cutter means for comminuting purposes, said cutter means being detachably mounted at the rear outlet of the harvester-thresher. A straw accelerating drum with sieve means, which separate any still present residual grain, is mounted upstream of the bladed shaft which is mounted in said cutter means and is provided with blade comb, said shaft and comb being enclosed by a housing.

Said sieve means simultaneously form the guide faces for supplying the straw to the straw accelerating drum, each sieve means having a trough portion associated therewith at its lower end for collecting the residual grain. An auger, which is mounted in said trough portion conveys the residual grain to a lateral winnowing grain elevator which re-supplies the residual grain to the sieve box via a chute.

15 Claims, 8 Drawing Figures

U.S. Patent  Mar. 3, 1987  Sheet 1 of 3  4,646,757
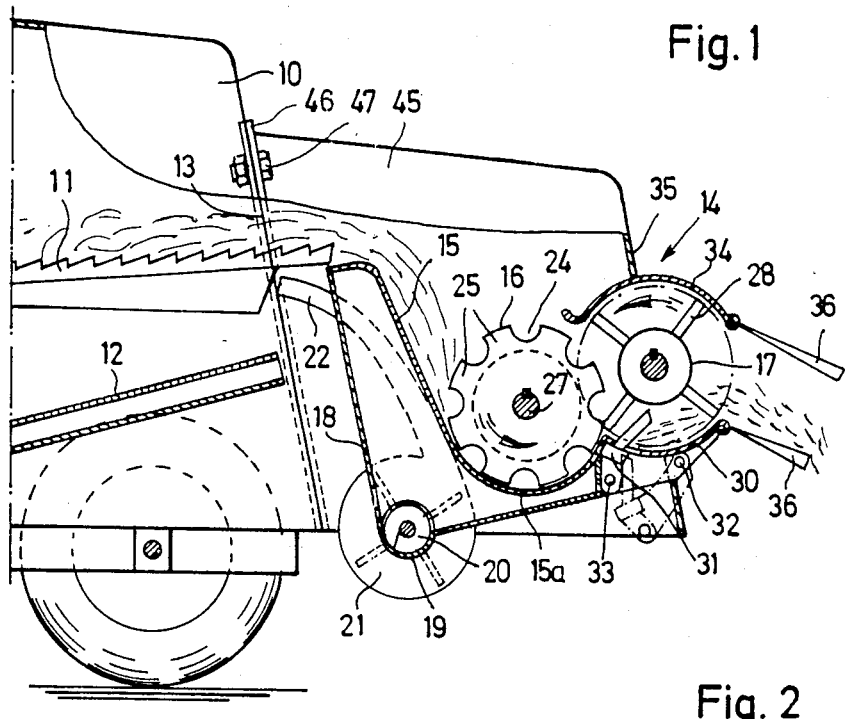
Fig. 1
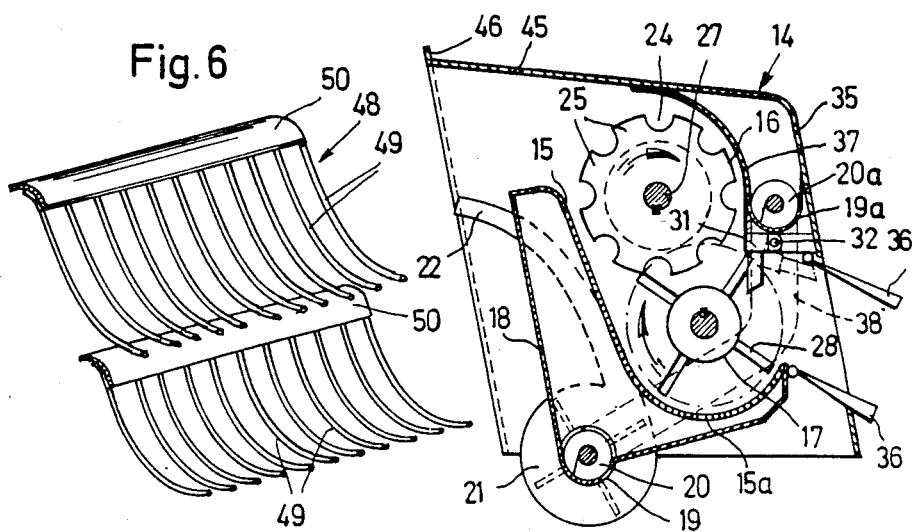
Fig. 6
Fig. 2

4,646,757

HARVESTER-THRESHER

The present invention relates to a harvester-thresher having shakers and sieves which separate the grain.

Because of the constantly increasing grain yields and the masses of straw, some of which is still not fully ripened, the grain separating devices of the harvester-thresher, particularly the shaker or shakers, are subjected to considerable load, often with the result that not all the grain is separated and some falls onto the field together with the straw or is dispersed over the ground by an attached straw cutter together with the chopped straw.

Since the shakers which have been used hitherto only separate the grain to a limited extent, the invention seeks to provide an additional means for attachment to conventional harvester-threshers, whereby it is also possible to separate residual grain, so that only straw is supplied to the cutter.

This object is achieved by the features of the claims.

According to the present invention there is provided in a harvester-thresher including a threshing drum or including a shaker which conveys the straw, which has been separated from grain, to a rear outlet and a cutter having a bladed shaft and being detachably mounted at the outlet of the harvester-thresher and being connected downstream of said drum or shaker, the improvement comprising at least one straw accelerating drum mounted immediately upstream of the bladed shaft and having sieve means which are spaced from said drum and permit falling residual grain to pass therethrough.

Such a device has considerable advantages, including, inter alia, a complete separation of the residual grain due to the additional acceleration of the straw emerging from the harvester-thresher. The straw accelerating drum which is used is distinguished for its high degree of efficiency since acceleration causes the straw to be spread apart, and the heavier grain detaches itself and falls into sieves and/or conveyor means connected at the outlet end of said drum.

To achieve a particularly good conveyance of straw and to prevent the straw from winding, it is highly preferable to permit the straw accelerating drum and the knives of the cutter, which is connected downstream of the drum, to intermesh or interdigitate with one another. For this purpose, the axle of the accelerating drum and the blade shaft of the cutter are mounted so that they are closer together than the sum of the circumferential radii of both arrangements.

It is also within the scope of the invention to provide only one straw distributing drum instead of a straw cutter connected downstream.

The invention extends not only to the individual features, but also to the advantageous combination of such features.

Embodiments of the invention are shown, by way of example, in the drawings and described more fully hereinafter, wherein:

FIG. 1 is a side elevational view, partially in section, or the rear shaker and outlet of a harvester-thresher having a rear cutter arrangement which is provided with a straw accelerating drum mounted upstream of a bladed cutter shaft and forming a first embodiment of the invention;

FIG. 2 is a vertical sectional view through a similar cutter as FIG. 1 but illustrated on its own and having a straw accelerating drum disposed above the bladed shaft and forming a second embodiment;

FIG. 6 is a perspective view of a modified guide surface (sieve means), formed from two crosspiece members having rods mounted beside one another with a spacing therebetween;

Figure 3:
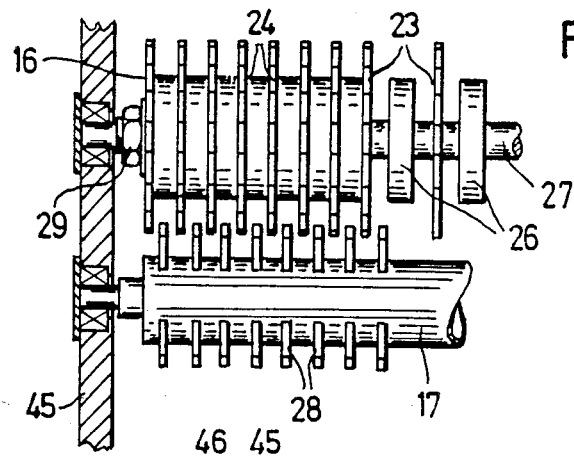
FIG. 3 is a plan view of a portion of the straw accelerating drum having a blade shaft which interdigitates or intermeshes in an offset manner.

In the drawings there is illustrated part of a combine harvester or a harvester-thresher 10 wherein the material is processed, for example, in a threshing drum (not shown) which is disposed transversely to the direction of travel, i.e. the grain is separated from the straw and the straw is then transferred to shakers 11 which are connected downstream and lie substantially horizontally. In such a case, as a result of the movement of the shakers 11, loose grain is separated from the straw, whilst the straw is conveyed to the rear outlet of the harvester-thresher. The grain falls through the shaker mechanism 11 onto a sieve box 12 which is disposed therebeneath and the grain is then conveyed to a grain tank or collecting vessel (not shown). The shakers 11 are provided with rails, bars or similar means to form slots and they extend to the rear outlet of the harvester-thresher 10, whereby the straw can then fall through an aperture 13 onto the freshly harvested field or, however, as shown in FIG. 1, a cutter arrangement 14 is mounted on the harvester-thresher and the straw is fed to said cutter for comminuting purposes.

Complete separation of the grain from the straw is not always ensured in the main body 10 of the harvester, especially when the material is too compact or too wet, with the result that residual grain would without cutter 14 be dropped onto the field with the falling straw.

In order to separate this residual grain from the straw in combination with the shakers 11, within the cutter 14 a sieve 15 is provided which is in the form of a guide surface and, in its upper portion, partially engages beneath the shakers 11. The sieve 15 is mounted in the cutter 14 and initially collects the falling straw. It is possible, therefore, that some of the residual grain can already have dropped through the sieve 15. The lower portion of such sieve 15 is bent in a partially curved or circular manner to form a trough 15a which accommodates a straw-carrying accelerating drum 16 with a small spacing therebetween, said drum 16 having a horizontal axis.

This straw accelerating drum 16 grips the straw at a high speed, thereby accelerating it, and subsequently conveys it to the blade shaft 17 of the cutter 14. During this acceleration of the straw, the residual grain contained therein is separated from the straw because of its inertia due to its weight. It is pushed against the surface of the partially part-circular trough 15a of the sieve 15 and falls through the holes in the sieve. A rectangularly shaped wall 18 is kept substantially parallel to the sieve 15 at a distance below said sieve, ribs of said wall 18 being inclined in the horizontal plane, on the one hand, and in the vertical plane, on the other hand. The residual grain, which falls through the sieve 15, is collected in the vessel or housing portion which is formed by the wall 18. The wall 18 forms a groove or channel 19 in the inlet region of the two ribs of the sieve 15, and a worm conveyor or auger 20 having a horizontal axis is mounted in said groove 19 and conveys the residual grain to one side. The sieve 15, with the wall 18 disposed therebeneath, and the worm conveyor 20 are suitably formed so that, in respect of their width, they correspond to that of the cutter 14. A winnowing elevator 21 (fanning mill) is connected to the worm conveyor 20 and re-supplies any residual grain, via a guide duct or pipe 22, the collector trough of the shaker or to the sieve box 12 of the harvester-thresher 10. In consequence, only straw is still supplied to the blade shaft 17 by means of this straw accelerating drum 16.

The accelerating drum 16 is mounted between the blade shaft 17 of the cutter and the sieve 15 and preferably has circular discs 23 with a plurality of punched-out portions 24 being disposed on the periphery of said discs 23 and forming teeth 25, said portions 24 being, for example, semi-circular. A spacer ring 26 is disposed between each toothed disc 23 and has a smaller diameter than the disc 23, such spacer rings 26 together being jointly non-rotatably tensioned on a splined shaft 27. The discs 23 and the spacer rings 26 are tensioned on the splined shaft 27 by the provision, for example, of nuts 29 at each end of said shaft so that, when necessary, the discs can be easily replaced.

The spacer rings 26, which are disposed between the discs 23, permit the radially disposed blades 28 of the blade shaft 17 to engage between the discs 23 and prevent the straw from becoming wound round the spacer rings 26—thereby ensuring satisfactory operation (please refer to FIGS. 1 to 3 of the drawing).

The discharge end of the partially circular sieve 15 is connected to a guide plate 30—which is also curved—beneath the cutter, and said guide plate 30 is spaced from the blade shaft 17. A cutter-type comb 31 serves as a counter abutment for the blade shaft 17 and is pivotably mounted in the transitional region between the sieve 15 and the guide plate 30. After a lateral bolt 33 has been loosened, the blade comb 31 is pivotable about a pivotal axis 32 out of the rotating blade shaft 17. An additional guide plate 34 for the straw is mounted substantially horizontally opposite the guide plate 30 and above the cutter. The two guide plates 30 and 34 protrude rearwardly from the rear wall 35 of the cutter 14 and have, on each respective end, a pivotable deflector plate 36 for guiding the straw.

In the embodiment shown in FIG. 2 of the drawing, the bladed shaft 17 of the cutter 14 is mounted in the sieve trough 15a, whilst the straw accelerating drum 16 is transversely mounted above the blade shaft 17. The teeth 25 and the blades 28 intermesh or interdigitate with one another. The bladed shaft 17 and the accelerating drum 16 also rotate in opposite directions (see direction of arrows). In such arrangement, the accelerator drum 16 has an additional sieve 37 associated therewith, said sieve 37 being spaced from the drum 16 and extending from the upper wall of the cutter 14 to the rear wall 35. A channel or groove 19a is also formed between the rear wall 35 and the sieve 37 and accommodates a further worm conveyor 20a which conveys the residual grain into a lateral chute 38 and feeds it to the winnowing or lifting elevator 21. This arrangement of the accelerating drum 16 permits a more compact construction to be achieved, with an additional sieve 37 providing for even better separation of the residual grain from the straw.

Figure 4:
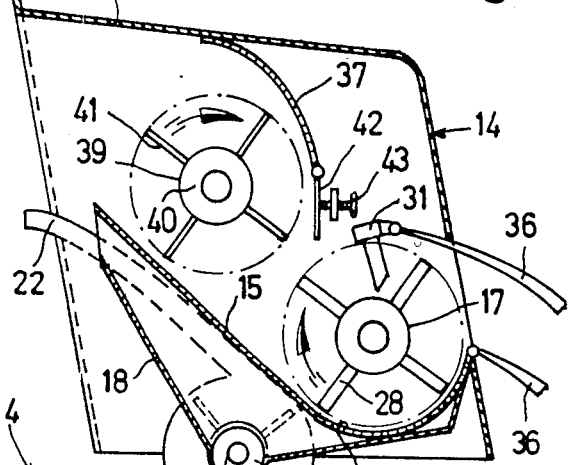
FIG. 4 is a vertical sectional view through a third embodiment with a cutter shown on its own and having a straw accelerating drum, which is disposed in a position extending inclinedly relative to the shaker, and an adjustable flap member.

The embodiment illustrated in FIG. 4 of the drawing shows the cutter 14 with a blade shaft 17 disposed in the trough 15a and shows an upper accelerating drum 39 which is directed towards the shakers 11 and also has a sieve 37 associated thereabove. This accelerating drum 39 has, for example, a cylindrical tube or pipe 40 which has radially protruding carrier fingers 41 secured thereto. In such a case, these carrier fingers 41 are spaced from the blades 28 of the blade shaft 17. A flap member 42, in the form of a deflector, may thus be secured to the lower end of the sieve 37 and may be adjustable by means of an adjusting screw 43, such as a hand-wheel or similar means. Because the flap member 42 constricts flow, it is possible to compact the straw, thereby producing a higher acceleration of the straw.

Figure 5:
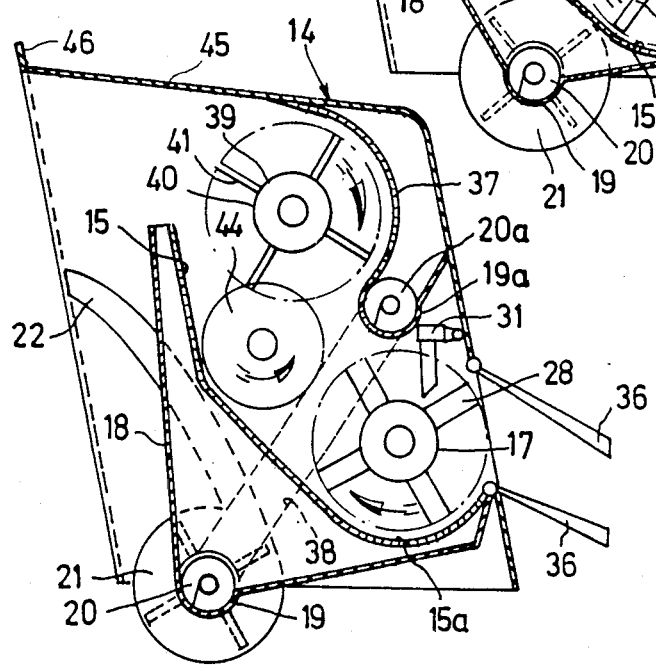
FIG. 5 is a vertical sectional view through a modified cutter having a straw accelerating drum, which is spaced from the bladed shaft, and a grain separating drum which is mounted upstream of said straw accelerating drum and forming a fourth embodiment.

FIG. 5 of the drawing illustrates accelerating drum 39 positioned on a line joining their axes of rotation subtending an acute angle relative to the vertical axis through the blade shaft 17 which also has an upper, rear sieve 37 associated therewith. This sieve 37 terminates at the lower end (similarly as shown in FIG. 2) and passes into a groove 19a which accommodates a worm conveyor 20a which supplies the residual grain to the winnowing elevator 21 via a shaft 38 which extends in a straight line. In this embodiment, the accelerating drum 39 has a separating drum 44 associated therewith, which drum 44 may also be formed from toothed discs 23 and spacer rings 26. In such a case, the straw is additionally accelerated and guided in respect of its direction.

With the accelerating drum 39 as shown in FIGS. 4 and 5 of the drawing, the carriers 41 may be pivotally attached to the cylindrical pipe or tube 40 as flails, thereby causing the straw to pass more flexibly between the sieve 37 and flap member 42 during rotation.

This cutter 14, which is formed from the blade shaft 17 and blade comb 31, is enclosed by a housing 45 which has its front portion open towards the harvester-thresher 10, the blade shaft 17 and the accelerating drums 16 and 39 being mounted on the lateral walls of said housing 45. A flange 46 encircles this aperture and extends outwardly at right angles, bores being formed in said flange 46, and screws 47 extending through said bores to secure the cutter 14 to the harvester-thresher 10. A detachable securement of this type permits the cutter 14 to be easily mounted on different types of harvester-threshers.

As shown in FIG. 6 of the drawing, a guide surface means 48 is used instead of a sieve 15, 15a which is in the form of a guide surface, and said guide surface 48 is formed from a plurality of bars or rods 49 which are disposed beside one another and are retained in position by a crosspiece member 50. The crosspiece member 50 likewise extends over the entire width of the cutter 14; the wall 18 is connected at its lower end to said crosspiece member 50 with a spacing therebetween. In this embodiment, the guide surface 48 may also be divided in accordance with the arrangement of the accelerating drums 16 and 39, as shown in FIGS. 2, 4 and 5 of the drawing. In such a case, two cross-piece members 50 are suitably mounted one below the other with a spacing therebetween, the rods 49 being secured to said cross-piece members 50. The free ends of the rods 49 are bent to correspond to the blade shaft 17 and the accelerating drums 16 and 39, respectively, and they thereby supply or convey the straw. The residual grain falls between the rods 49 and is likewise collected by the wall 18 and supplied to the winnowing elevator 21.

The elasticity of the resilient rods 49 thereby enables the straw to flow advantageously to the blade shaft 17, and an additional loosening of the straw is thereby effected in the transitional region of the divided and overlapping guide surface means 48.

Figure 7:
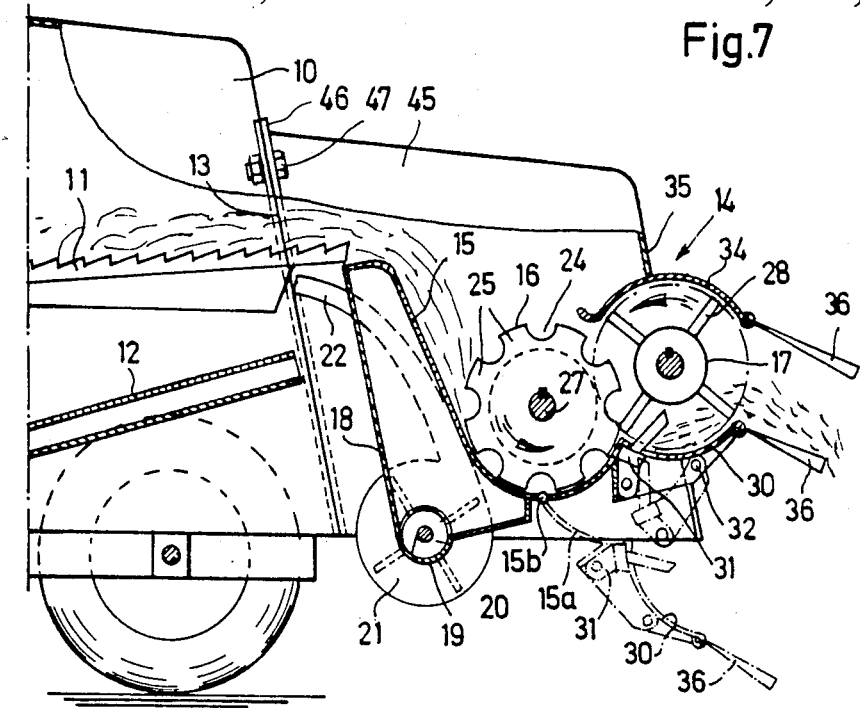
FIG. 7 is a side elevational view of the harvester-thresher of FIG. 1, showing a downwardly pivotable trough portion and guide plate with the blade comb.

FIG. 7 illustrates a modified embodiment of a cutter attached to the rear portion of a harvester-thresher and similar to that as shown in FIG. 1. In this arrangement, a trough portion 15a is pivotally mounted at the lower end of the sieve means 15 by means of an axle 15b and is downwardly pivotable together with guide plate 30, which is rigidly secured thereto, and the blade comb 31, which is also rigidly secured thereto, so that in this position (shown by dotted lines) a wide gap is produced beneath the accelerating drum 16—thereby permitting long straw to be thrown to the ground through said gap without such straw slipping through the cutter 14.

Figure 8:
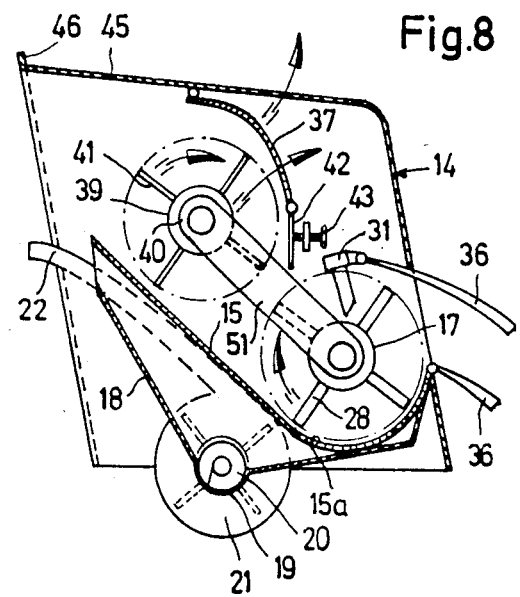
FIG. 8 is a vertical sectional view through the cutter similar to FIG. 4, but showing a pivotable accelerating drum and pivotable associated additional, upper sieve means.

FIG. 8 illustrates a modified embodiment for the rear portion of a harvester-thresher similar to the embodiment shown in FIG. 4. Upper accelerating drum 39 is mounted so as to be pivotable in the direction of the arrow by means of lateral pivotal levers 51 and in such a manner that the gap between said drum 39 and the sieve means 15 is increased and, in consequence, a larger gap is formed to permit a large amount of straw to pass between the sieve means 15 and the accelerating drum 39.

In addition, the upper sieve means 37 is also mounted so as to be upwardly pivotable in accordance with the direction of the arrow in order to provide space for the upwardly pivoting accelerating drum 39.

We claim:

1. In a harvester-thresher including a threshing drum or including a shaker which conveys straw which has been separated from grain to a rear outlet, and including a cutter with a bladed shaft which cutter is detachably mounted at the outlet of the harvester-thresher downstream of said drum or shaker with respect to the flow of harvested material, the improvement comprising at least one straw accelerating drum mounted immediately upstream and proximate of the bladed shaft and having sieve means which are spaced from said drum and permit falling residual grain to pass therethrough.

2. A harvester according to claim 1, wherein the straw accelerating drum extends parallel to the bladed shaft of the cutter and is mounted in the region where the straw falls from the shaker.

3. A harvester according to claim 1, wherein the sieve means is connected to the shaker and is in the form of a guide surface and acts to guide straw to the straw accelerating drum, and the sieve means bridges the spacing between the shaker and a blade comb of the cutter and is shaped in a partially curved manner to form a trough portion in the region of the straw accelerating drum.

4. A harvester according to claim 1 or 2, wherein the direction of rotation of the straw accelerating drum corresponds to the flow direction of the straw, and the blade shaft is rotatable in the direction of flow of the straw, or the direction of rotation of both the accelerating drum and of the bladed shaft is in the opposite direction to the direction of flow of the straw.

5. A harvester according to claim 1, wherein a worm conveyor together with a winnowing grain elevator is disposed beneath the sieve means and for supplying falling grain to a sieve box of the harvester, said worm conveyor and elevator being mounted in a groove-shaped channel in a rear wall.

6. A harvester according to claim 1, wherein the straw accelerating drum is formed from individual discs having spacer rings therebetween which keep said discs spaced apart; the diameter of said spacer rings being smaller than the diameter of the discs, and the spacer rings being jointly mounted in a tensioned manner on a splined shaft, said discs being provided on their periphery with teeth which are semi-circular, acute-angled or the like because of stamped-out portions, and wherein the discs interdigitate with the blades of the blade shaft.

7. A harvester according to claims 1 or 3, wherein the blade shaft is mounted in the partially curved portion of the sieve and the straw accelerating drum is mounted above the blade shaft, the straw accelerating drum having an additional sieve means associated therewith, said additional sieve means extending at the rear end of said drum.

8. A harvester according to claim 7, wherein the blade comb of the cutter is connected to the lower end of the upper additional sieve means and is mounted in a downwardly pivotable manner, and wherein a groove is formed above said blade comb, said groove extending to the additional sieve means and accommodating an additional auger which conveys grain to the winnowing elevator via a lateral shaft.

9. A harvester according to claim 1, wherein the straw accelerating drum is formed from a cylindrical tube having radially protruding carrier fingers.

10. A harvester-thresher according to claim 1, wherein a separating drum is mounted upstream of the straw accelerating drum which is mounted above the blade shaft with a spacing therebetween, said separating drum being in cooperative engagement with the straw accelerating drum.

11. A thresher according to claim 1, wherein the guide surface for the straw, which is disposed above the trough and is in the form of sieve means, is formed by at least one horizontal cross-piece member having rods, which are mounted thereon beside one another with a spacing therebetween, to form a guide surface, said rods being pivotably mounted at one end on the crosspiece member below the flow plane of the straw, and the other ends of said rods being bent in a partially curved manner and being freely resilient.

12. A harvester according to claim 11, wherein the guide surface is divided into two portions, each crosspiece member being mounted on the respective lateral wall of the housing, and the crosspiece members simultaneously forming the limit stop for the free ends of the overlapping rods.

13. A harvester according to claim 1, wherein the straw accelerating drum, which is mounted upstream of the blade shaft and blade comb, is mounted with sieve means and/or guide surfaces in the housing of the cutter.

14. A harvester according to claim 1, wherein the sieve means is shaped in a partially curved manner to form a trough portion in the region of the accelerating drum and has a guide plate connected thereto, and wherein said trough portion is mounted to be downwardly pivotable together with said guide plate.

15. A harvester according to claim 1, wherein the accelerating drum is mounted so as to be pivotable relative to the sieve means.

* * * * *